United States Patent Office 3,644,585
Patented Feb. 22, 1972

3,644,585
PROCESS FOR THE PREPARATION OF POLYBUTADIENE
Motowo Takayanagi, Fukuoka-shi, and Shotaro Sugiura, Tetsuro Matsuura, Haruo Ueno, Keiichi Tsuji, Shinzi Yamamoto, and Fuminori Matumoto, Ube-shi, Japan, assignors to Ube Industries, Ltd., Ube-shi, Yamaguchi-ken, Japan
No Drawing. Filed Dec. 13, 1968, Ser. No. 783,706
Claims priority, application Japan, Dec. 19, 1967, 42/80,934
Int. Cl. C08f 15/04
U.S. Cl. 260—879
12 Claims

ABSTRACT OF THE DISCLOSURE

Process for the preparation of polybutadiene by polymerizing 1,3-butadiene in the presence of a cis-1,4-polymerization catalyst, characterized in that trans-1,4-polybutadiene is added to the polymerization system in advance of the polymerization reaction, and the polymerization of 1,3-butadiene is performed in the presence of so added trans-1,4-polybutadiene.

---

This invention relates to a process for the preparation of polybutadiene. More particularly, the invention relates to a process for the preparation of novel polybutadiene composition obtained by cis-1,4-polymerizing 1,3-butadiene in the presence of trans-1,4-polybutadiene. The composition shows, when converted to the final product by vulcanization, excellent mechanical properties, particularly high tear strength.

Heretofore, the polymerization product having high cis-1,4-structural unit content obtained by polymerization of 1,3-butadiene, which is known as high cis-1,4-polybutadiene, has been produced in large quantities as a substitute of natural rubber for making rubber products such as tires. Many proposals have been made for increasing the cis-1,4-structural unit content of the polymer. One of the reasons for this popular use of high cis-1,4-polybutadiene is that the rubber products obtained therefrom exhibit superior physical properties, particularly good impact resilience, less generation of heat and excellent abrasion resistance, to those of the products from natural rubber. However, high cis-1,4-polybutadiene is subject to the significant deficiencies that its cold flow is great, and the rubber products obtained therefrom have very low tear strength. As the means for decreasing the cold flow of high cis-1,4-polybutadiene, many methods have already been proposed, but there has been no commercial method for increasing the tear strength of rubber products from cis-1,4-polybutadiene.

However, low tear strength of rubber product is considered to be one cause of chipping in tires, and therefore, improvement in tear strength of rubber products from polybutadiene has been a strong demand among the concerned fields.

Direct preparation of mixtures of cis-1,4-polybutadiene and trans-1,4-polybutadiene by polymerization of 1,3-butadiene in the concurrent presence of cis-1,4-polymerizing catalyst and trans-1,4-polymerizing catalyst for 1,3-butadiene, is known. (French Pat. No. 1,439,294.) According to this method, however, the tear strength of vulcanized rubber cannot be improved satisfactorily if the resultant polybutadiene mixtures may exhibit improved notched impact strength, hardness and resistance to aging.

The object of the present invention is to provide a process for the preparation of polybutadiene composition which shows remarkably improved tear strength when shaped into the final rubber product, not sacrificing the other inherent, excellent properties of cis-1,4-polybutadiene in any way.

The above object of the invention is accomplished by the process for preparation of polybutadiene by polymerizing 1,3-butadiene in the presence of a cis-1,4-polymerization catalyst, characterized in that trans-1,4-polybutadiene is added to the polymerization system in advance of the polymerization reaction, and the polymerization of 1,3-butadiene is performed in the presence of so added trans-1,4-polybutadiene.

In the present invention, as the trans-1,4-polybutadiene to be added to the polymerization system in advance, generally such polybutadiene containing no less than 50%, preferably no less than 70%, of trans-1,4-structural units are used. The molecular weight of the trans-1,4-polybutadiene is not critical, but uncrosslinked polymer having an intrinsic viscosity $[\eta]$ of 0.3–1.8, particularly 0.5–1.4, is preferred for improving the physical properties of the resultant polybutadiene composition, the said intrinsic viscosity being measured in toluene of 26° C.

The trans-1,4-polybutadiene employed in accordance with the invention may be any of those prepared by the means known per se. That is, generally trans-1,4-polybutadiene is prepared by polymerization of 1,3-butadiene in the presence of catalytic quantity of any catalyst known as having trans-1,4-polymerizing activity to 1,3-butadiene, such as follows:

(1) catalyst system composed of
   (a) titanium halide such as titanium tetrachloride, or vanadium halide such as vanadium oxychloride ($VOCl_3$), and
   (b) an organometallic compound such as that expressed by the general formula, $AlR_nX_{3-n}$, wherein R is an alkyl or phenyl radical, X is a halogen atom, and $n$ is an integer of 1–3;
(2) rhodium chloride catalyst,
(3) peroxide catalyst for example, organic hydroperoxide or peroxide, such as cumene hydroperoxide, diisopropylbenzene hydroperoxide, tert-butyl hydroperoxide, benzoyl peroxide, aldehyde peroxide, etc.
(4) alkali metal catalyst, such as metallic lithium, sodium, potassium, etc., or
(5) alfine-catalyst, viz, catalyst containing isopropoxysodium and allyl-sodium at the mol ratio of approximately 1:1.

The polymerization may be performed in the presence of organic solvent, or, depending on the type of catalyst employed, performed by emulsion polymerization in an aqueous medium. The polymerization conditions can be those known per se. That is, the temperature may generally range from 0° to 80° C.

There is also a process for the preparation of trans-1,4-polybutadiene by irradiation polymerization of 1,3-butadiene in the presence of titanium halide. Any of trans-1,4-polybutadienes prepared by the foregoing and any other known processes can be utilized in the present invention.

The amount of the trans-1,4-polybutadiene to be added in accordance of the invention is obviously variable depending on the amount of 1,3-butadiene to be cis-1,4-polymerized. It may be such that will make the content of the trans-1,4-polybutadiene obtained with the use of trans-1,4-polymerization catalyst, in the finally obtained polybutadiene composition, 5–50% by weight, preferably 5–30% by weight.

In the invention, "cis-1,4-polymerization catalyst" includes all the catalysts capable of polymerizing 1,3-butadiene to give polybutadiene containing no less than 70% of cis-1,4-structural units.

Examples of such catalysts which can be used in the subject process with advantage include:

(A) catalysts composed of
  (a) metallic cobalt or nickel, a material formed by electro-chemically depositing metallic cobalt or nickel on the powder of metallic zinc; compounds of cobalt or nickel, such as halides and carboxylates having 2–15 carbon atoms; chelate compounds of cobalt or nickel, e.g., chelate of β-diketone or β-ketonic acid ester with cobalt or nickel, and
  (b) organoaluminum compound, such as that expressed by the general formula $$AlR_nX_{3-n}$$

wherein R is an alkyl or phenyl radical, X is a halogen atom and $n$ is an integer of 1–3.
  (The catalysts of (A) above may contain, as the third component, Lewis acid such as aluminium trichloride, boron trifluoride, etc., or Lewis base such as pyridine, aniline, etc.)

(B) catalysts composed of
  (a) titanium compound of the general formula $$Ti(OR')_pX_{4-p}$$

wherein R is an alkyl of 1–8 carbons, X is a halogen atom, and $p$ is an integer of 0–4, X being iodine when $p$ is zero, and
  (b) organoaluminum compound of the general formula $$AlR_nX_{3-n}$$

wherein R, X, and $n$ having the same significations as defined in the foregoing.
  (The catalyst of (B) above may contain the aforesaid Lewis acid or Lewis base.)

(C) catalysts consisting of halide of cobalt or nickel, metallic aluminum, and Lewis acid such as aluminum trichloride, phosphorus pentachloride, mercury chloride, etc.

The material formed by electrochemically depositing metallic cobalt or nickel on the powder of metallic zinc, which may be used in the catalyst of (A), is disclosed in the following specification: U.S. copending application Ser. No. 603,775, now U.S. Pat. 3,423,387. As the halide of cobalt or nickel, chloride is preferred. As the carboxylate of cobalt or nickel, octoate, naphthenate, benzoate, etc. are used with advantage.

As β-diketone and β-ketonic acid ester to be used as a component of organic complex salt of cobalt or nickel, acetylacetone, acetoacetic ethyl ester, etc. may be named.

As the titanium compound to be used in the catalysts of type (B), titanium tetraiodide, titanium tributoxychloride, tetrabutoxytitanium, dibutoxydichlorotitanium, etc., may be named.

Also as the organoaluminum compound to be used in the catalysts of (A) and (B), triethylaluminum, triisobutylaluminum, diethylaluminum monochloride, monoethylaluminum dichloride, ethylaluminum sesquichloride, etc. may be named.

The appropriate amount of the catalyst varies depending on the type of catalyst, but in any case the conventionally employed range of the described type of catalyst is usable.

Among the (A) type catalysts, when the cobalt or nickel component consists of either of those metals or a material formed by electrochemically depositing metallic cobalt or nickel on the powder of metallic zinc, or cobalt or nickel halide, it is preferred to use 0.025–5 g. of the cobalt or nickel component per 100 g. of 1,3-butadiene, and 0.1–5 times an organoaluminum compound based on the weight of the cobalt or nickel component. Again, when carboxylate or organic complex salt of cobalt or nickel is used as the cobalt or nickel component in (A) type catalysts, preferably 0.002–0.1 millimol of such component, and 2.0–100 millimols of an organoaluminum compound, per 100 g. of 1,3-butadiene, are used.

As aforesaid, those catalysts may contain the third component, in such amounts as no more than 10 mols, preferably at most 5 mols, of Lewis acid, or no more than equimolar amount, preferably not exceeding ½ mol, of Lewis base, per mol of the organoaluminum compound.

Also in the (B) type catalysts, the preferred amount of titanium compound is 1–100 millimols, and that of the organoaluminum compound, 1–100 millimols, per 100 g. of 1,3-butadiene to be polymerized, and the preferred mol ratio between the organoaluminum compound to the titanium compound is no less than 1.

In the (C) type catalysts, the preferred practice is to use 0.5–20 mols of metallic alumimu mand 0.1–13 mols of Lewis acid such as aluminum trichloride, per mol of cobalt or nickel component, and the resultant catalyst system is used at such a ratio that 0.05–10 g. of the cobalt or nickel component is present in the polymerization system per 100 g. of 1,3-butadiene.

According to the process of this invention, trans-1,4-polybutadiene prepared in advance in the presence of the afore-described trans-1,4-polymerization catalyst is dissolved or suspended in an organic solvent, and to which a catalytic amount of cis-1,4-polymerization catalyst is added. The polymerization of 1,3-butadiene is performed in that reaction system.

As the organic solvent, any known inert organic solvent which is capable of dissolving or suspending trans-1,4-polybutadiene is useful. For example, aromatic hydrocarbons, aliphatic hydrocarbons, alicyclic hydrocarbons and their halogen-substituted compounds, etc. can be appropriately used. Particularly preferred solvents are benzene, toluene, cyclohexane, chlorobenzene, etc.

The polymerization reaction is performed preferably in the absence of oxygen, by substituting the polymerization atmosphere in the reaction system with nitrogen gas, or deaerating under a reduced pressure.

The appropriate 1,3-butadiene concentration in the inert organic solvent before initiation of polymerization ranges 5–30% by weight. It is permissible to add, if desired, any known antigelling agent, molecular weight modifier, dispersing agent, etc. to the polymerization system.

The polymerization temperature is that generally applied to cis-1,4-polymerization of 1,3-butadiene. Generally, temperatures ranging from −20 to +80° C., particularly +5–+50°., are advantageously applied.

The polymerization pressure may be atmospheric or above. Generally the polymerization is carried out at the pressure ranging from atmospheres to ten atmospheres.

In accordance with the invention, the polymerization is performed until the intrisic viscosity of the finally obtained polybutadiene composition, as measured in 26° C. toluene, $$[\eta]_{toluene}^{26°\,C.}$$

reaches 1.7–5.0, preferably 2.0–3.5.

Thus, at the appropriate stage a short-stopper is added to the system to stop the progress of reaction. Then the polymer is precipitated either by addition of a precipitant such as methanol or acetone, or by flashing (removal of polymerization solvent by evaporation, with optional blowing of steam into the system). Thus separated polybutadiene is thereafter dried and recovered.

The critical feature of this invention is that 1,3-butadiene is cis-1,4-polymerized in the presence of trans-1,4-polybutadiene which is formed prior to the polymerization reaction, and that the so prepared polybutadiene composition, when shaped into ruber product, substantially retains the excellent properties of high cis-1,4-polybutadiene, such as high impact resilience and abrasion resistance, and furthermore exhibits remarkably improved tear strength.

It is confirmed that the finished rubber products from the polybutadiene composition of the invention exhibit tear strength of the same order as that of the products from natural rubber, and also high elongation. As already explained, an attempt to improved mechanical properties of polybutadiene by forming mixtures of trans-1,4-polybutadiene and cis-1,4-polybutadiene, from polymerization of 1,3-butadiene in the concurrent presence of trans-1,4-polymerization catalyst and cis-1,4-polymerization catalyst, is known. However, the so formed mixtures fail to show satisfactory tear strength, when vulcanized and formed into finished rubber products, as demonstrated in details in the later appearing control.

Whereas, quite surprisingly the polybutadiene composition obtained by cis-1,4-polymerization of 1,3-butadiene in the presence of priorly formed trans-1,4-polybutadiene shows the remarkably improved tear strength, which is a desirable property for such utilities as tires, etc., when the composition is vulcanized and shaped into final product. The structure of the polybutadiene composition obtained in accordance with the process of the invention has not yet been fully clarified. However, in view of the fact that the polybutadiene composition prepared by the process of the invention exhibits mechanical characteristic entirely different from those of the simple mixtures of trans-1,4-polybutadiene and cis-1,4-polybutadiene, presumably the structure also is quite different from simple mixture of the two polymers. In fact, when the polybutadiene composition in accordance with the invention is treated with osmic acid which shows different dyeing rates for trans-1,4-polybutadiene and cis-1,4-polybutadiene, and examined with an electron microscope, infiltration of fibrous cis-1,4-polybutadiene into the trans-1,4-polybutadiene particles is observed.

The polybutadiene composition obtained in accordance with the invention can be compounded with known compounding ingredients conventionally used with natural rubber and cis-1,4-polybutadiene, for example, vulcanizing agent, vulcanization-accelerator, reinforcing agent, filler, extender, antioxidant, pigments, etc., kneaded, shaped and vulcanized by the means known per se, to provide the desired rubber products.

The rubber made from the polybutadiene composition of the invention exhibits remarkably high tear strength, and therefore provides tires which hardly undergo chipping.

The polybutadiene composition may also be used as blended with natural rubber or other synthetic rubber.

Hereinafter the working examples of the invention will be given, wherein the microstructure of polybutadiene was determined by infrared absorption spectrum analysis [R. Humpton; Analytical Chemistry, 21, 923 (1949)]. Also the tear strength was measured as to the test specimens of 10 mm. x 20 mm. x 0.4 mm. in size, which was notched by 10 mm. from the center of one 10-mm. long side to the longitudinal direction in straight line, in accordance with the method of simple extension tear test [Journal of Applied Polymer Science, 3, 168 (1960)].

The intrinsic viscosity $$[\eta]_{toluene}^{26°C.}$$

was calculated from the specific viscosity measured with an Ostwald's viscometer in toluene at 26° C.

EXAMPLE 1

The inside atmosphere of a 500-cc. capacity autoclave was substituted with nitrogen gas, and thereafter the autoclave was charged with 200 cc. of n-heptane, 100 g. of 1,3-butadiene, 5.6 millimols of vanadium trichloride, and 11.2 millimols of triethylaluminum. The autoclave was closed air-tight and the contents were reacted for 24 hours at 25° C. with stirring.

Thus obtained reaction product was added to a large amount of methanol, to form a solid polymer, which was then separated and dried to provide cotton-like polybutadiene.

The microstructure of the polybutadiene was as follows: trans-1,4-structural unit content, 99%; vinyl structural unit content, 1%; and intrinsic viscosity $$[\eta]_{toluene}^{26°C.}$$

was 1.3.

Three (3) g. of thus obtained trans-1,4-polybutadiene was placed in a 500 cc. capacity flask, and dissolved in 80 cc. of benzene at 30° C.

To the solution then another solution consisting of 15 g. of 1,3-butadiene dissolved in 100 cc. of benzene was added, and air in the flask was replaced by nitrogen gas, followed by addition of still another solution consisting of 20 cc. of benzene, 0.2 millimol of cobalt octoate, and 20 millimols of diethylaluminum monochloride. The system was maintained at 30° C., and polymerized for 120 minutes under stirring.

Then 100 cc. of methanol containing 1% of phenyl-β-naphthylamine was added to the system to precipitate the polymer. Thus recovered polymer was washed with methanol and dried in vacuum at room temperature. Thus 19 g. of polybutadiene was obtained as a rubber-like polymer.

The microstructure of this polybutadiene was as follows: cis-1,4-structural unit content, 66.9%; trans-1,4-structural unit content, 29.7%; and vinyl structural unit content, 3.4%. The intrinsic viscosity $$[\eta]_{toluene}^{26°C.}$$

of this polybutadiene was 3.2.

This polybutadiene was compounded in accordance with the following recipes (A) and (B). The compound was vulcanized at 160° C. for 40 minutes in recipe (A), and at 140° C. for 40 minutes in recipe (B).

Recipe (A): Parts
Polybutadiene _____ 100
Zinc oxide _____ 2
Stearic acid _____ 0.5
Vulcanization-accelerator CZ (cyclohexyl-benzothiazyl sulphenamide) _____ 1
Vulcanization-accelerator TT (tetramethylthiurame disulfide) _____ 0.3
Sulfur _____ 2
Antioxidant (phenyl-β-naphthylamine) _____ 1

Recipe (B): Parts
Polybutadiene _____ 100
Oil (EESSO B–1 naphthenic process oil) _____ 8.0
Zinc oxide _____ 5.0
Stearic acid _____ 3.0
Antioxidant (phenyl-β-naphthylamine) _____ 1.0
HAF carbon black _____ 50
Vulcanization-accelerator DPG (diphenylguanidine) _____ 0.15
Vulcanization-accelerator NOBS (N-hydroxydiethylene-2-benzothiazole sulphenamide) __ 1.0
Sulfur _____ 1.25

The vulcanized product from the compound of recipe (A) had a tear-strength of 5.0 kg./cm., tensile strength of 41.6 kg./cm.$^2$, and an elongation of 274%.

Also the vulcanized product from the compound of recipe (B) had a tear strength of 45.0 kg./cm., tensile strength of 210 kg./cm.$^2$, and an elongation of 390%.

Controls 1–4

By way of comparison, in the recipes (A) and (B) in Example 1, the polybutadiene composition was replaced in each run by a blend of cis-1,4-polybutadiene and trans-1,4-polybutadiene (control 1), high cis-1,4-polybutadiene (control 2), low cis-1,4-polybutadiene (control 3) and natural rubber (control 4). The compounds of recipe (A) were vulcanized at 160° C. for 40 minutes, and the compounds of recipe (B), at 140° C. for 40 minutes. The properties of thus obtained vulcanized products are given in Table 1.

In the same table, properties of the vulcanized products of compounds of recipes (A) and (B) of Example 1 are also shown.

The natural rubber used in Control 4 had an $[\eta]_{toluene}^{26°C.}$ of 4.6.

TABLE 1
Properties of Vulcanized Product

| Polybutadiene | Recipe (A) | | | Recipe (B) | | |
|---|---|---|---|---|---|---|
| | Tear strength (kg./cm.) | Tensile strength (kg./cm.²) | Elongation (percent) | Tear strength (kg./cm.) | Tensile strength (kg./cm.²) | Elongation (percent) |
| Example 1 | 5.0 | 41.6 | 274 | 45.0 | 210 | 390 |
| Control 1 | 1.4 | 7.8 | 158 | 12.0 | 157 | 353 |
| Control 2 | 0.4 | 10.9 | 84 | 10.1 | 180 | 400 |
| Control 3 | 0.6 | 13.4 | 117 | | | |
| Control 4 | 6.7 | 164.3 | 492 | 22.4 | 200 | 648 |

Incidentally, the polybutadiene blend used in Control 1 was that obtained by dissolving 20 wt. parts of the trans-1,4-polybutadiene employed in Example 1 and 80 wt. parts of the cis-1,4-polybutadiene of Control 2 in benzene and mixing the same, and precipitating a solid polymer therefrom by adding the solution into a large amount of methanol $$([\eta]_{toluene}^{26°C.} = 2.0)$$

In Control 2, cis-1,4-polybutadiene containing 98% of cis-1,4-structural unit, 1% of trans-1,4-structural unit, and 1% of vinyl structural unit $$([\eta]_{toluene}^{26°C.} = 2.2)$$

was employed. In Control 3 polybutadiene containing 38.8% of cis-1,4-structural unit, 48.6% of trans-1,4-structural unit, and 12.6% of vinyl structural unit $$([\eta]_{toluene}^{26°C.} = 2.2)$$

was used. The polybutadienes employed in Controls 2 and 3 were those obtained by polymerization of 1,3-butadiene in the absence of trans-1,4-polybutadiene.

The results in above Table 1 clearly indicate that the rubber from polybutadiene prepared according to the invention exhibits tear strength and elongation much higher than those of the rubbers from other polybutadienes, and approximately equal to those of natural rubber. The product of the invention also shows considerably greater tensile strength than that of the rubbers from other polybutadienes.

EXAMPLES 2-15

Polybutadiene compositions were prepared by polymerizing 1,3-butadiene in the similar manner to Example 1, in the presence of the same trans-1,4-polybutadiene employed in Example 1 and a cis-1,4-polymerization catalyst of the type varied in each run.

Thus obtained compositions were compounded in accordance with the recipes (A) and (B) given in Example 1, and vulcanized under the same conditions are employed in Example 1.

The operational conditions and the results are given in Tables 2 and 3.

TABLE 2

| | Example | | | | | | | |
|---|---|---|---|---|---|---|---|---|
| | 1 | 2 | 3 | 4 | 5 | 6 | 7 | 8 |
| Cis-1,4-polymerization catalyst | A | B | C | D | E | F | G | H |
| Trans-1,4-polybutadiene amount (g.) | ¹5 | ²3 | ²3 | ¹3 | ¹2 | ¹2 | ¹3 | ¹3 |
| 1,3-butadiene amount (g.) | ¹15 | ¹20 | ²20 | ¹30 | ¹20 | ¹20 | ¹20 | ¹30 |
| Polymerization temperature (°C.) | 30 | 30 | 30 | 30 | 30 | 30 | 25 | 40 |
| Polymerization time (min.) | 120 | 30 | 120 | 40 | 60 | 60 | 300 | 30 |
| Amount of polybutadiene obtained (g.) | 19 | 20 | 20 | 27 | 22 | 17 | 21 | 22 |
| Intrinsic viscosity $[\eta]_{toluene}^{26°C}$ | 3.2 | 2.5 | 2.0 | 3.0 | 4.0 | 2.8 | 3.8 | 2.0 |
| Microstructural unit content (percent): | | | | | | | | |
| Trans-1,4 | 29.7 | 15.5 | 17.5 | 13.0 | 10.2 | 13.1 | 16.3 | 8.5 |
| Vinyl | 3.4 | 1.0 | 3.5 | 2.9 | 2.5 | 2.8 | 4.2 | 2.0 |
| Cis-1,4 | 66.9 | 83.5 | 79.0 | 84.1 | 87.3 | 84.1 | 79.5 | 89.5 |
| Properties of vulcanized product compound of recipe A): | | | | | | | | |
| Tear strength (kg./cm.) | 5.0 | 5.5 | 5.0 | 4.0 | 2.5 | 3.4 | 3.8 | 2.2 |
| Tensile strength (kg./cm.²) | 41.6 | 23.0 | 21.0 | 19.3 | 14.6 | 17.5 | 20.0 | 14.8 |
| Elongation (percent) | 274 | 420 | 400 | 330 | 285 | 300 | 365 | 230 |
| Properties of vulcanized product (compound of recipe B): | | | | | | | | |
| Tear strength (kg./cm.) | 45.0 | | | 35.1 | | 31.8 | | 27.3 |
| Tensile strength (kg./cm.²) | 210 | | | 190 | | 185 | | 180 |
| Elongation (percent) | 390 | | | 440 | | 400 | | 460 |

¹ Dissolved in 100 cc. of benzene.
² Dissolved in 80 cc. of benzene.

NOTE.—The alphabetical symbols given in the column under the heading "cis-1,4-polymerization catalyst" stand for the following:

A.—0.2 millimol of cobalt octoate and 20 millimols of diethylaluminum monochloride, as dissolved in 20 cc. of benzene.

B.—1 gram of a material formed by electrochemically depositing metallic cobalt on the powder of metallic zinc (Co content 13 wt. percent) which is prepared by adding metal zinc powder into an aqueous solution of cobalt chloride, and 20 millimols of diethylaluminum monochloride, as dissolved in 20 cc. of benzene.

C.—0.3 millimol of titanium tetraiodide, and 1.4 millimols of triisobutylaluminum, as dissolved in 20 cc. of benzene.

D.—1.0 gram of mercuric chloride, 0.1 g. of metallic cobalt, and 16.6 millimols of diethylaluminum monochloride, as dissolved in 100 cc. of benzene, and added with 0.15 g. of water.

E.—0.1 millimol of cobalt (III) acetylacetonate and 10 millimols of diethylaluminum monochloride, as dissolved in 100 cc. of benzene.

F.—0.2 millimol of nickel (II) acetylacetonate and 10.0 millimols of diethylaluminum monochloride, as dissolved in 100 cc. of benzene.

G.—3.3 millimols of cobalt chloride (anhydride) and 17 millimols of diethylaluminum monochloride, as dissolved in 100 cc. of benzene.

H.—Five (5) cc. of the catalyst system prepared by adding 4.4 g. of nickel chloride (water content, 8%) 2.0 g. of metallic aluminum powder, and 7.0 g. of phosphorus pentachloride, to 100 cc. of monochlorobenzene, followed by aging at 80° C. for 5 hours.

TABLE 3

|  | Example | | | | | | |
|---|---|---|---|---|---|---|---|
|  | 9 | 10 | 11 | 12 | 13 | 14 | 15 |
| Cis-1,4-polymerization catalyst | I | J | K | L | M | N | O |
| Trans-1,4-polybuadiene amount (g.) | ¹2 | ¹1 | ¹3 | ¹5 | ¹3 | ¹3 | ¹3 |
| 1,3-butadiene amount (g.) | ¹23 | ¹20 | ¹30 | ¹15 | ¹30 | ¹20 | ¹20 |
| Polymerization temperature (° C.) | 30 | 30 | 40 | 40 | 30 | 30 | 30 |
| Polymerization time (min.) | 60 | 960 | 30 | 30 | 15 | 30 | 120 |
| Amount of polybutadiene obtained (g.) | 17 | 13 | 28 | 17 | 31 | 20 | 21 |
| Intrinsic viscosity $[\eta]_{toluene}^{26°\ C.}$ | 2.0 | 2.5 | 2.0 | 2.5 | 2.0 | 2.3 | 2.1 |
| Micro-structural unit content (percent): | | | | | | | |
| Trans-1,4 | 15.3 | 10.2 | 15.0 | 32.7 | 12.0 | 16.0 | 16.8 |
| Vinyl | 2.8 | 5.1 | 3.8 | 3.2 | 1.5 | 1.5 | 2.9 |
| Cis-1,4 | 71.0 | 84.7 | 81.2 | 64.1 | 86.5 | 82.5 | 80.3 |
| Properties of vulcanized product (compound of recipe A): | | | | | | | |
| Tear strength (kg./cm.) | 3.4 | 3.2 | 4.2 | 5.5 | 3.5 | 5.2 | 4.0 |
| Tensile strength (kg./cm.²) | 18.1 | 17.8 | 20.6 | 47.3 | 16.5 | 22.5 | 21.5 |
| Elongation (percent) | 380 | 290 | 410 | 210 | 315 | 433 | 384 |
| Properties of vulcanized product (compound of recipe B): | | | | | | | |
| Tear strength (kg./cm.) |  | 31.0 | 39.3 | 48.0 |  |  | 35.2 |
| Tensile strength (kg./cm.²) |  | 190 | 196 | 225 |  |  | 186 |
| Elongation (percent) |  | 450 | 470 | 384 |  |  | 440 |

¹ Dissolved in 100 cc. of benzene.

NOTE.—The alphabetical symbols in the column under the heading "cis-1,4-polymerization catalyst" stand for the following:

I.—Catalyst system prepared by adding 50 mg. of nickel (II) naphthenate and 0.79 g. of boron trifluoride ethylether to 130 cc. of benzene, aging the same for 10 minutes at 30° c., adding thereto 10.5 millimols of triethylaluminum, and aging the system for 20 minutes at 40° C.

J.—1.0 millimol of titanium tributoxychloride and 3.0 millimols of diethylaluminum monoiodide as dissolved in 100 cc. of n-heptane.

K.—Five (5) cc. of the catalyst prepared by adding 4.4 g. of cobalt chloride (water content, 8.0%), 2.0 g. of metallic aluminum powder, and 7.0 g. of phosphorus pentachloride, to 100 cc. of monochlorobenzene, and aging the system for 5 hours at 80° C.

L.—Five (5) cc. of the catalyst prepared by adding 4.4 g. of cobalt chloride (water content, 8.0%), 2.0 g. of metallic aluminum powder, and 7.0 g. of phosphorus pentachloride, to 100 cc. of monochlorobenzene, and aging the system for 5 hours at 80° C.

M.—Catalyst prepared by dissolving 0.05 g. of metallic cobalt, 1.5 g. of pyridine, and 11.2 millimols of monoethylaluminum dichloride in 10 cc. of benzene, and aging the solution at 30° C. for 60 minutes.

N.—0.2 millimol of cobalt octoate and 20 mill mols of diethylaluminum monochloride, as dissolved in 20 cc. of benzene.

O.—5 millimols of triisobutylaluminum and 1 millimol of titanium tetraiodide, as dissolved in 100 cc. of benzene.

EXAMPLE 16

A 500 cc. capacity autoclave with its inside air purged by nitrogen gas was charged with 200 cc. of n-heptane, 5.0 millimols of triisobutylaluminum, 10 millimols of titanium tetrachloride, and 20 g. of 1,3-butadiene, and closed air-tight. The contents were polymerized at 30° C. for 5 hours with stirring.

From the reaction product the gelled portion was removed, and powdery polybutadiene was obtained. The microstructure of the polybutadiene was as follows: content of trans-1,4-structural unit, 95.0%, vinyl structural unit, 2.0%, and cis-1,4-structural unit, 3.0%. The intrinsic viscosity, $$[\eta]_{toluene}^{26°\ C.}$$

was 0.77.

Four (4) g. of thus obtained trans-1,4-polybutadiene was placed in a 500 cc. flask, and dissolved in 100 cc. of benzene at 30° C.

To the solution then a solution formed by dissolving 20 g. of 1,3-butadiene in 100 cc. of benzene was added, and the air inside the flask was substituted with nitrogen gas. Further as solution formed by dissolving 0.2 millimol of cobalt octoate and 20 millimols of diethylaluminum monochloride in 20 cc. of benzene was added to the system, followed by the polymerization reaction at 30° C. for 120 minutes, under stirring.

Thereafter 100 cc. of methanol containing 1% of phenyl-β-naphthylamine was added to the system to precipitate the polymer. Thus recovered polymer was washed with methanol and dried in vacuum at room temperature. Whereupon 23 g. of polybutadiene was obtained in the form of a rubber-like polymer.

The microstructure of this polybutadiene was as follows: content of cis-1,4-structural unit, 73.7%; trans-1,4-structural unit, 22.5%; and vinyl structural unit, 3.5%. The intrinsic viscosity $$[\eta]_{toluene}^{26°\ C.}$$

was 3.5.

This polybutadiene was compounded in accordance with the recipes (A) and (B) given in Example 1, and the resultant compounds were vulcanized under the same conditions employed in Example 1.

The vulcanized product from the compound of recipe (A) had a tear strength of 4.5 kg./cm., tensile strength of 27.5 kg./cm.², and an elongation of 370%.

Also the vulcanized product from the compound of recipe (B) had a tear strength of 40.7 kg./cm., tensile strength of 200 kg./cm.², and an elongation of 400%.

EXAMPLES 17–18

Polybutadiene compositions were prepared by polymerizing 1,3-butadiene using the same trans-1,4-polybutadiene as employed in Example 16, while the type of cis-1,4-polymerization catalyst was varied in each run. The polymerization conditions were the same as those in Example 16 in all runs.

Thus obtained compositions were compounded in accordance with the recipes (A) and (B) given in Example 1, and the compounds were vulcanized under the same conditions as employed in Example 1.

The operational conditions and the results are given in Table 4.

TABLE 4

| | Example | | |
|---|---|---|---|
| | 16 | 17 | 18 |
| Cis-1,4-polymerization catalyst | P | Q | R |
| Trans-1,4-polybutadiene amount (g.) | ¹ 4 | ¹ 2 | ¹ 2 |
| 1,3-butadiene amount (g.) | ¹ 20 | ¹ 30 | ¹ 25 |
| Polymerization temperature (° C.) | 30 | 30 | 30 |
| Polymerization time (min.) | 120 | 120 | 60 |
| Amount of polybutadiene obtained (g.) | 23 | 32 | 22 |
| Intrinsic viscosity $[\eta]_{toluene}^{26°\,C.}$ | 3.5 | 3.5 | 3.3 |
| Micro-structural unit content (percent): | | | |
| Trans-1,4 | 22.5 | 8.4 | 10.3 |
| Vinyl | 3.5 | 1.5 | 2.5 |
| Cis-1,4 | 73.7 | 90.1 | 87.2 |
| Properties of vulcanized product (compound of recipe A): | | | |
| Tear strength (kg./cm.) | 4.5 | 2.8 | 2.9 |
| Tensile strength (kg./cm.²) | 27.5 | 15.0 | 15.4 |
| Elongation (percent) | 370 | 300 | 296 |
| Properties of vulcanized product (compound of recipe B): | | | |
| Tear strength (kg./cm.) | 40.7 | 30.5 | 34.1 |
| Tensile strength (kg./cm.²) | 200 | 196 | 198 |
| Elongation (percent) | 400 | 481 | 476 |

¹ Dissolved in 100 cc. of benzene.

NOTE.—The alphabetical symbols given in the column under the heading "cis-1,4-polymerization catalyst" stand for the following:
  P.—0.2 millimol of cobalt octoate and 20.0 millimols of diethylaluminum monochloride, as dissolved in 100 cc. of benzene.
  Q.—0.2 millimol of cobalt octoate and 20.0 millimols of diethylaluminum monochloride, as dissolved in 100 cc. of benzene.
  R.—0.7 gram of a material formed by electrochemically depositing metallic cobalt on the powder of metallic zinc and 10 millimols of diethylaluminum monochloride, as dissolved in 6 cc. of benzene, and thereafter aged for 60 munites at 40° C.

Control 5

This control is to demonstrate that the polymerization of 1,3-butadiene with the concurrent use of cis-1,4-polymerization catalyst and trans-1,4-polymerization catalyst does not achieve the improvement in tear strength of the rubber product.

(1) Preparation of polybutadiene

In a 2-liter capacity flask with its inside atmosphere having been substituted with nitrogen gas, 1,000 cc. of benzene, a solution formed by dissolving 0.3 millimol of cobalt (III) acetylacetonate, 0.086 millimol of vanadium (III) acetylacetonate (mol ratio of Co/V=3.5) and 20 millimols of ethylaluminum sesquichloride in 20 cc. of benzene, and 90 g. of 1,3-butadiene were added by the order stated. Then the polymerization was performed in the flask at 30° C. for 60 minutes.

Thus 45.9 g. (yield: 51.0%) of polybutadiene was obtained, which had a microstructure as follows: trans-1,4-structural unit content, 9,4%; vinyl structural unit content, 1.0%; and cis-1,4-structural unit content, 89,6%. Also the intrinsic viscosity $$[\eta]_{toluene}^{26°\,C.}$$

of the polybutadiene was 3.8. The whole polybutadiene furthermore had a melting point of 125.0° C., crystallinity of 2.7%. The precipitated portion in the fraction test (which will be explained later) had a melting point of 131.0° C. and a crystallinity of 49.7%.

The melting point was measured with a Differential Scanning Calorimeter (DSC), and the crystallinity was measured by X-ray diffraction analysis.

The results of fractionation test of this polybutadiene were as follows:

Results of Fractionation Test*

| | Percentage of recovered polymer (percent) | Cis-1,4- structural unit (percent) | Trans-1,4- structural unit (percent) | Vinyl structural unit (percent) |
|---|---|---|---|---|
| Precipitate portion | 4.2 | 12.6 | 87.3 | 0.1 |
| Solution portion | 95.8 | 96.2 | 3.2 | 0.6 |

*Method of the fractionation test.

Five (5) g. of the sample polybutadiene was dissolved in 250 cc. of toluene at 60–70° C., and the solution was cooled to approximately −20° C. to cause partial precipitation of the polybutadiene. Thus obtained slurry was subjected to a centrifugal separation at 0–10° C., to be separated into precipitate and solution. The precipitate was further subjected to the same separation procedures, with the use of 100 cc. of toluene. The same procedures were still repeated twice thereafter.

The finally obtained precipitate was dried to provide polybutadiene, and the total of the four solution portions were added into a large amount of methanol to precipitate the polybutadiene contained therein. The precipitate was dried. The microstructures of the polybutadienes from the precipitate portion and the solution portion were determined with infrared absorption spectrum analysis.

This polybutadiene was compounded with other substances in accordance with the recipes (A) and (B) as given in Example 1, and vulcanized each under the same conditions as employed in Example 1.

The vulcanized product from the compound of recipe (A) had a tear strength of 1.5 kg./cm., tensile strength of 18.2 kg./cm.², and an elongation of 285%.

The vulcanized product from the compound of recipe (B) had a tear strength of 12 kg./cm., tensile strength of 227 kg./cm.², and an elongation of 433%.

Also for comparison, the polybutadiene produced in accordance with the present invention was subjected to the same fractionation test, and its crystallinity and melting point were measured.

The sample polybutadiene employed was that obtained in Example 17.

Results of Fractionation Test

| | Percentage of recovered polymer (percent) | Microstructure (percent) | | |
|---|---|---|---|---|
| | | Trans-1,4- structural unit | Vinyl structural unit | Cis-1,4 structural unit |
| Precipitate portion | 9.0 | 90.1 | 0.5 | 9.4 |
| Solution portion | 91.0 | 2.3 | 1.5 | 96.2 |

The whole polymer had a melting point of 131.0° C., and a crystallinity of 5.8%. The precipitate portion had a melting point of 135.0° C., and a crystallinity of 54.5%.

From the foregoing experimental results, the following points are clearly proven, i.e., (1) That the polybutadiene composition prepared in accordance with the invention exhibits markedly higher tear strength in the form of final rubber product, compared with the product from polybutadiene mixture obtained by simultaneous cis-1,4-, and trans-1,4-polymerization of 1,3-butadiene.

(2) That the polybutadiene composition within the scope of this invention possesses higher crystallinity and melting point than those of the polybutadiene mixture, and therefore has a structure different from that of the latter.

We claim:

1. A process for the production of a butadiene composition having a high tear strength after vulcanization which comprises the steps of:
   (1) polymerizing 1,3-butadiene in the presence of a trans-polymerization catalyst to produce a trans-butadiene polymer having a trans-1,4-structure content of at least 70% and an intrinsic viscosity of from 0.3 to 1.8 as measured at 26° C. in toluene;
   (2) isolating the product of step (1) as a solid polymer;
   (3) dissolving or dispersing the solid polymer of step (2) in an inert organic solvent to prepare a solution or dispersion of said solid polymer;
   (4) adding to said solution or dispersion of step (3) butadiene-1,3 and a cis-1,4-polymerization catalyst as the sole polymerization catalyst to produce a further polymerization system; and
   (5) polymerizing the system of step (4) until the intrinsic viscosity of the resulting product as measured at 26° C. in toluene is 1.7 to 5.0;
the amount of said trans-butadiene polymer produced in step (1) present in step (5) being such that the final product contains from 5% to 30% by weight of said trans-butadiene polymer.

2. The process of claim 1 wherein said cis-1,4-polymerization catalyst is composed of
   (1) a component selected from the group consisting of metallic cobalt, metallic nickel, a material formed by electrochemically depositing metallic cobalt or nickel on the powder of metallic zinc, halides of cobalt or nickel, carboxylates of cobalt or nickel having 2–15 carbons, and complex salts of cobalt or nickel with β-diketone or β-ketonic acid esters; and
   (2) an organoaluminum compound of the general formula, $$AlR_nX_{3-n}$$

wherein R is an alkyl or phenyl radical, X is a halogen atom, and $n$ is an integer of 1–3.

3. The process of claim 2 in which 0.002–0.1 millimol of the component (1) and 2.0–100 millimols of the component (2), per 100 g. of 1,3-butadiene, are present in the catalyst system.

4. The process of claim 1 wherein said cis-1,4-polymerization catalyst is composed of:
   (1) a titanium compound of the general formula $$Ti(OR')_pX_{4-p}$$

wherein R is an alkyl radical, X is a halogen atom, $p$ is an integer of 0–4, X being iodine when $p$ is zero, and
   (2) an organoaluminum compound of the general formula $$AlR_nX_{3-n}$$

wherein R is an alkyl or phenyl radical, X is a halogen atom, and $n$ is an integer of 1–3.

5. The process of claim 4 in which 1–100 millimols of the component (1), and 1–100 millimols of the component (2), per 100 g. of 1,3-butadiene, are present in the catalyst system.

6. The process of claim 1 in which the cis-1,4-polymerization catalyst is composed of (1) a halide of a metal selected from the group consisting of cobalt and nickel, (2) metallic aluminum, and (3) a Lewis acid.

7. The process of claim 6 in which the catalyst system contains, per mol of the component (1), 0.5–20 mols of component (2) and 0.1–13 mols of the component (3), and the catalyst system is used at such a ratio that 0.05–10 g. of the component (1) is present in the polymerization system per 100 g. of 1,3-butadiene.

8. A process for the production of a butadiene composition having a high tear strength after vulcanization which comprises the steps of:
   (1) polymerizing 1,3-butadiene in the presence of a trans-polymerization catalyst to produce a trans-butadiene polymer having a trans-1,4-structure content of at least 70% and an intrinsic viscosity of from 0.3 to 1.8 as measured at 26° C. in toluene;
   (2) isolating the product of step (1) as a solid polymer;
   (3) dissolving or dispersing the solid polymer of step (2) in an inert organic solvent to prepare a solution or dispersion of said solid polymer;
   (4) adding to said solution or dispersion of step (3) butadiene-1,3 and a cis-1,4-polymerization catalyst system selected from the group consisting of
      (A) catalyst systems composed of (1) a component selected from the group consisting of metallic cobalt, metallic nickel, a material formed by electrochemically depositing metallic cobalt or nickel on the powder of metallic zinc, halides of cobalt or nickel, carboxylates of cobalt or nickel having 2–15 carbons, and complex salts of cobalt or nickel with β-diketone or β-ketonic acid ester, and (2) an organoaluminum compound of the general formula $$AlR_nX_{3-n}$$

wherein is an alkyl or phenyl radical, X is a halogen atom, and $n$ is an integer of 1–3;
      (B) catalyst systems composed of (1) a titanium compound of the general formula $$Ti(OR')_pX_{4-p}$$

wherein R is an alkyl radical, X is a halogen atom, and $p$ is an integer of 0–4, X being iodine when $p$ is zero, and (2) the above-defined organoaluminum compound; and
      (C) catalyst systems composed of a halide of a metal selected from the group consisting of cobalt and nickel, metallic aluminum, and a Lewis acid; to produce a further polymerization system; and
   (5) polymerizing the system of step (4) at a temperature of from −20°–80° C. until the intrinsic viscosity of the resulting product as measured at 26° C. in toluene is 1.7 to 5.0; the amount of said trans butadiene polymer produced in step (1) present in step (5) being such that the final product contains from 5% to 30% by weight of said trans-butadiene polymer.

9. The process of claim 2 wherein said cis-1,4-polymerization catalyst further contains
   (3) up to 10 mols of a Lewis acid or up to 1 mol of a Lewis base per mol of organoaluminum compound.

10. The process of claim 4 wherein said cis-1,4-polymerization catalyst further contains
    (3) up to 10 mols of a Lewis acid or up to 1 mol of a Lewis base per mol of organoaluminum compound.

11. The process of claim 8 wherein catalyst system (A) further contains
    (3) up to 10 mols of a Lewis acid or up to 1 mol of a Lewis base per mol of organoaluminum compound.

12. The process of claim 8 wherein catalyst system (B) further contains
   (3) up to 10 mols of a Lewis acid or up to 1 mol of a Lewis base per mol of organoaluminum compound.

References Cited

UNITED STATES PATENTS

| | | | |
|---|---|---|---|
| 3,140,278 | 7/1964 | Kuntz | 260—94.2 |
| 3,301,840 | 1/1967 | Zelinski | 260—94.2 |
| 3,423,387 | 1/1969 | Sugiura et al. | 260—94.3 |
| 3,476,830 | 11/1969 | Naarmann et al | 260—879 |
| 3,489,823 | 1/1970 | Naarmann et al. | 260—879 |

JOSEPH L. SCHOFER, Primary Examiner

K. A. GAITHER, Assistant Examiner

U.S. Cl. X.R.

260—94.3

UNITED STATES PATENT OFFICE
CERTIFICATE OF CORRECTION

Patent No. 3,644,585　　　　　　　　Dated February 22, 1972

Inventor(s) Motowo Takayanagi et al.

It is certified that error appears in the above-identified patent and that said Letters Patent are hereby corrected as shown below:

Columns 9 and 10, Table 3, the 9th entry under Example 9, "71.0" should read -- 71.9 --.

Signed and sealed this 4th day of July 1972.

(SEAL)
Attest:

EDWARD M. FLETCHER, JR.　　　　　　ROBERT GOTTSCHALK
Attesting Officer　　　　　　　　　Commissioner of Patents

UNITED STATES PATENT OFFICE
CERTIFICATE OF CORRECTION

Patent No. 3,644,585             Dated February 22, 1972

Inventor(s) Motowo Takayanagi et al

It is certified that error appears in the above-identified patent and that said Letters Patent are hereby corrected as shown below:

Certificate of Correction Under 35 U.S.C. 225

Claim 1, line 1 delete "butadiene" and substitute -- polybutadiene --.

Claim 8, line 1 delete "butadiene" and substitute -- polybutadiene --.

Signed and sealed this 28th day of November 1972.

(SEAL)
Attest:

EDWARD M. FLETCHER, JR.
Attesting Officer

ROBERT GOTTSCHALK
Commissioner of Patents